(12) United States Patent
Menon

(10) Patent No.: US 8,292,561 B2
(45) Date of Patent: Oct. 23, 2012

(54) CAGE NUT ASSEMBLY

(76) Inventor: Narayanan P. Menon, Bloomfield Hills, MI (US)

( * ) Notice: Subject to any disclaimer, the term of this patent is extended or adjusted under 35 U.S.C. 154(b) by 722 days.

(21) Appl. No.: 11/873,526

(22) Filed: Oct. 17, 2007

(65) Prior Publication Data

US 2009/0103996 A1   Apr. 23, 2009

(51) Int. Cl.
*F16B 37/04* (2006.01)
(52) U.S. Cl. .......................... 411/111; 411/971
(58) Field of Classification Search .............. 411/111, 411/112, 113, 970, 971
See application file for complete search history.

(56) References Cited

U.S. PATENT DOCUMENTS

| | | | | |
|---|---|---|---|---|
| 2,144,553 A | * | 1/1939 | Simmonds | 411/111 |
| 2,304,107 A | * | 12/1942 | Leisure | 411/111 |
| 2,469,312 A | * | 5/1949 | Poupitch | 411/85 |
| 4,316,675 A | * | 2/1982 | Melicque | 403/22 |
| 4,929,136 A | * | 5/1990 | Mee | 411/432 |
| 5,096,350 A | | 3/1992 | Peterson | |
| 5,630,686 A | * | 5/1997 | Billmann | 411/112 |
| 6,027,293 A | * | 2/2000 | Beemer et al. | 411/119 |
| 6,644,902 B1 | | 11/2003 | Cutshall | |
| 7,021,875 B2 | * | 4/2006 | Yake et al. | 411/111 |
| 7,086,817 B2 | * | 8/2006 | Clinch et al. | 411/111 |
| 7,147,418 B2 | * | 12/2006 | Clinch et al. | 411/112 |
| 7,736,111 B2 | * | 6/2010 | De Azevedo et al. | 411/520 |
| 2004/0047705 A1 | | 3/2004 | Cutshall | |

\* cited by examiner

*Primary Examiner* — Flemming Saether
(74) *Attorney, Agent, or Firm* — Gregory T. Zalecki

(57) ABSTRACT

An improved cage nut assembly is comprised of a cage, a pair of slots, a nut, a flange and a strip. The cage has four walls which form a four sided enclosure. Each of a pair of opposing walls contains a slot. The flange extends from the nut such that its planar surface is perpendicular to the longitudinal axis of the nut. The flange and the nut have a common opening for receiving a bolt. The strip is attached to the nut and the flange. The strip is inserted into the slots to suspend the nut within the cage. The walls and the flange are shaped to limit rotation of the flange. The nut floats in two dimensions. The nut and the flange may be removed through the bottom of the cage.

12 Claims, 6 Drawing Sheets

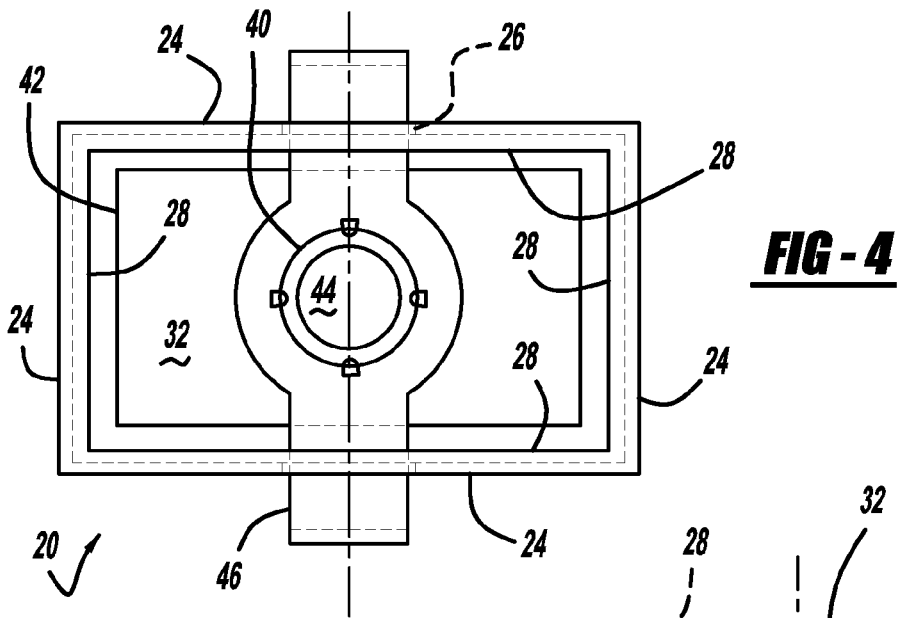
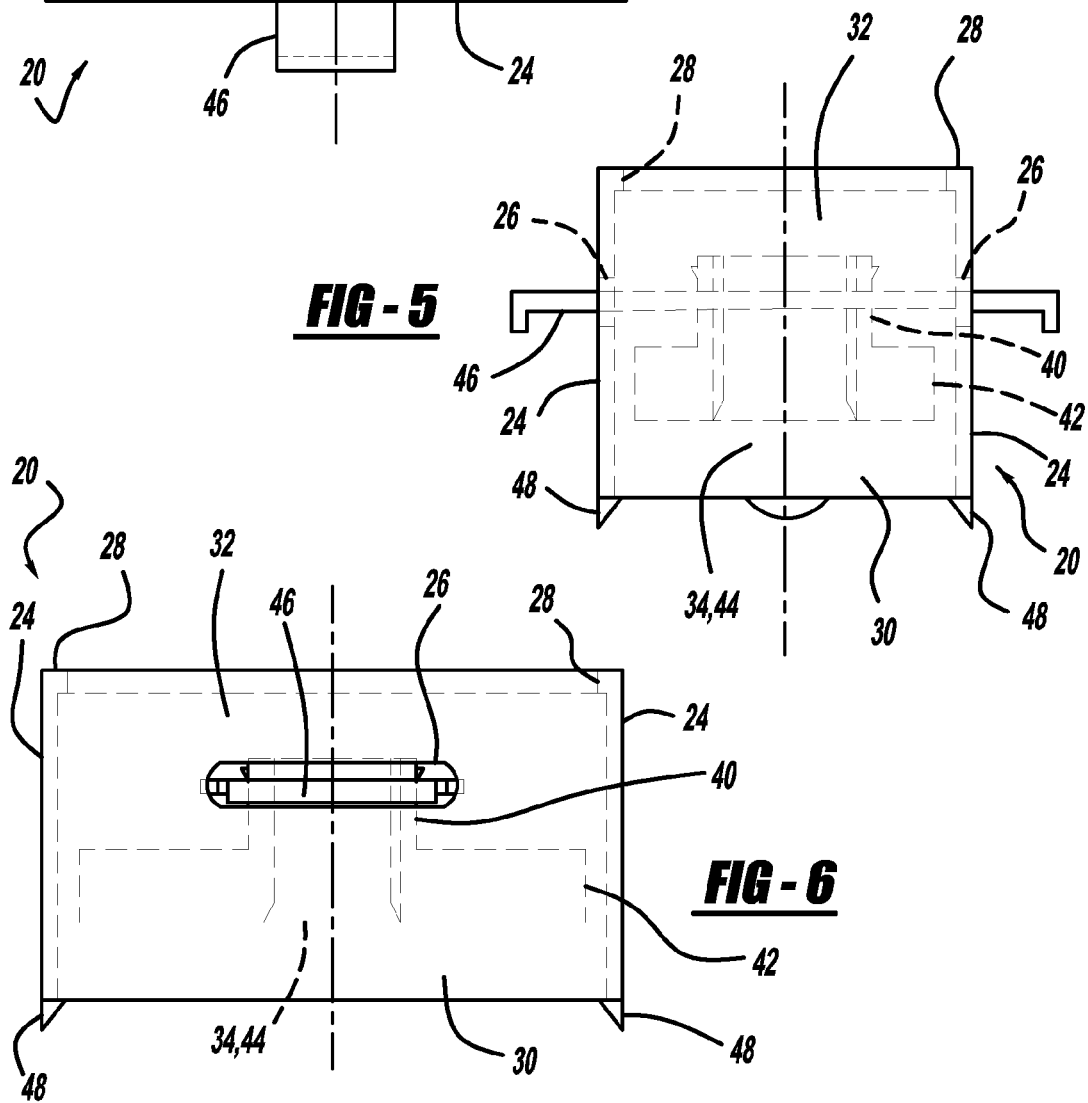
*FIG - 4*
*FIG - 5*
*FIG - 6*

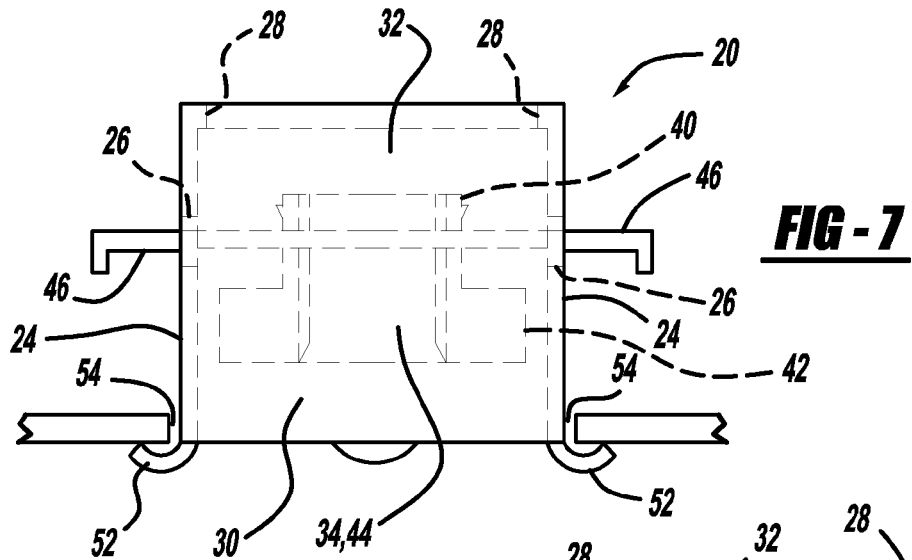
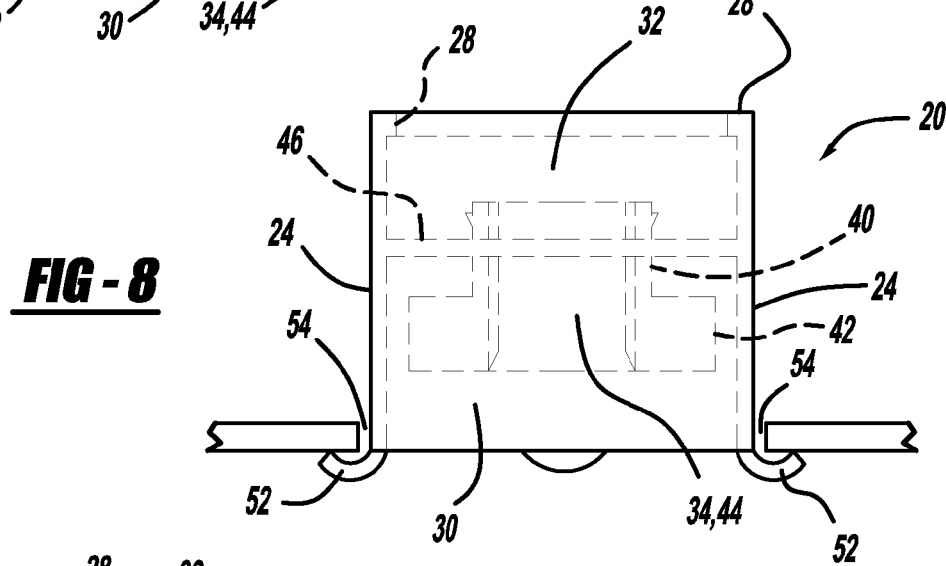
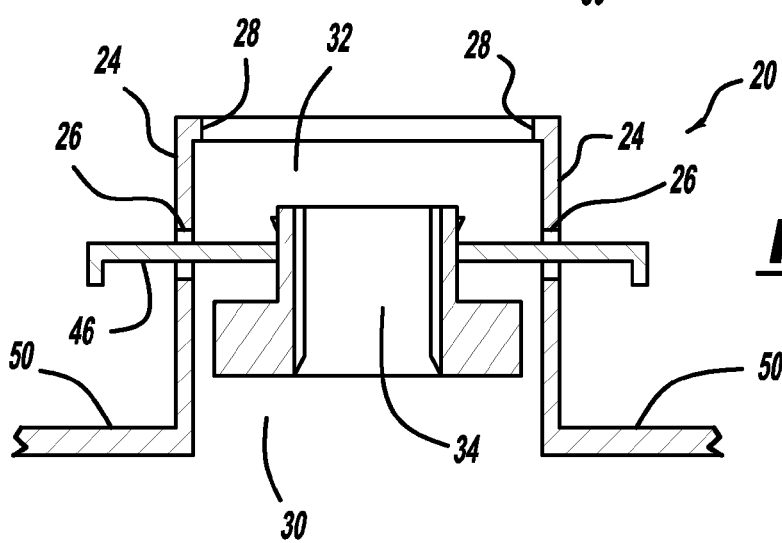

CAGE NUT ASSEMBLY

BACKGROUND

Cage nuts (also known as cage nut assemblies) are used to bolt two structures together. The cage nut contains a threaded nut. The threaded nut is enclosed by a cage. The cage nut is attached, such as by welding, to the rear of a first structure. The nut does not freely rotate within its cage. As a result, the first structure is provided with threads into which a bolt may be tightened. A second structure is positioned adjacent to the first structure such that a bolt may simultaneously extend through an opening within each structure and the threads of the nut. The bolt is tightened to secure the structures together. Cage nuts are useful in providing a fixed threaded base in an area which is difficult to access. For example, a cage nut may be attached to the interior surface of an enclosed automobile door pillar. Cage nuts are also used to speed the assembly of two previously fabricated subassemblies together. One subassembly has a cage nut attached to it. The second subassembly may be quickly attached to the first subassembly with a bolt.

In addition to providing threads for attachment to a bolt, a cage nut also provides for the variable or floating positioning of the nut. Often a nut is needed in an inaccessible location and the nut must be able to be repositioned prior to its attachment to a bolt. The automobile door pillar previously described is such an example. Not only are threads needed on the interior of the door pillar, the threads must be repositionable. After a door and a hinge are attached to a door pillar with a bolt and a cage nut, the door must be aligned with the automobile body. Cage nuts allow the door to be moved into an aligned position because the nut may move, or be repositioned, within the cage. After appropriate alignment between the door on the automobile body is obtained, the bolt is tightened into the nut to maintain the alignment. Typically, a plurality of cage nuts are used to attach a door to a door pillar.

A typical prior art cage nut has a cage comprising three walls covered by a plate. The walls form a three sided rectangular enclosure. The fourth side does not have a wall. Rather, a bendable tab extends from the plate to retain a nut and a flange within the enclosure. The plate is at the exit end of the enclosure. The other end is the entrance end. The entrance end is where a bolt enters. Thus, the exit end may be referred to as the bottom of a cage nut assembly. The nut and the flange are fixed together. The flange and the walls are configured so that the nut and the flange may move within the cage structure, but rotation of the flange is limited by contact with one or more of the walls so that the bolt may be tightened into the nut.

Several problems are associated with the design of prior art cage nut assemblies. If the flange and the nut need to be removed from the cage after installation upon a structure, the flange and the nut may only be removed through the wall opening where the bendable tab extends. The bendable tab is bent out of the way and the nut and flange are removed laterally from the cage. The nut and the flange are not removable through the bottom of the cage because removal is prevented by the plate. One of the functions of the plate is to retain the nut and the flange within the cage. Therefore, the orientation of the cage nut assembly upon a limited access structure may be limited to an orientation which permits lateral removal of the nut and the flange through the open wall without interference. Since the cage is comprised of three walls and an open wall forming a cage structure the amount of torque which may be applied to the nut and the flange is limited. A three walled rectangular structure with a fourth open wall will fail with a lower degree of bolt torque than a four walled rectangular structure. Another problem is the amount of nut and flange surface area which contacts the plate and walls of the cage. If the cage nut assembly is mounted so that the plate prevents the flange and the nut from falling out of the cage due to gravity, a large portion of the nut and flange bottom surface will be in contact with the plate. Other mounting positions of the cage nut assembly may result in side surfaces of the flange being held in contact with one of the walls of the cage by gravity. It is not uncommon for a cage nut assembly to be subjected to a paint process or an electrocoating process after attachment to a structure. These processes are usually directed at the structure itself and are incidentally applied to the cage nut assembly. The process may involve post process baking such as paint baking. As a result, the nut and the flange become fixed to the cage. When the nut and flange are fixed to the cage, variable positioning of the nut and the flange are lost. The bond between the nut and the flange and the cage must then be broken in order to reachieve the variable positioning of the nut and the flange within the cage. This consumes manufacturing time.

A cage nut assembly is needed which would have the following features. Its cage would have four walls forming a four sided enclosure. This would increase the maximum torque which may be applied to the nut. The nut and the flange would be removable through the bottom of the cage. This would allow the cage nut assembly to be oriented in many more positions within a confined assembly area, such as a door pillar. The position of the open wall for lateral removal of the nut and the flange would no longer be a factor. The nut and the flange would be suspended within the cage, rather than resting upon the cage structure. This would minimize the tendency of the nut and the flange to be welded to the cage by paint or electrocoating material.

The improved cage nut assembly described herein satisfies these needs.

SUMMARY

In its broadest form my invention is a cage threaded fastener assembly. The cage threaded fastener assembly is comprised of a cage, one or more slots, a threaded fastener, a flange and a strip. The cage has a plurality of walls. The walls are configured to encage a threaded fastener and a flange. The cage has an entrance end and an exit end. In the preferred embodiment the cage has four walls which form a four sided enclosure. At least one of the walls has a slot. Preferably, there is a slot in each of a pair of opposing walls. The preferred threaded fastener is a nut. This invention also encompasses other threaded fasteners enclosed within the cage, such as threaded bolts. The flange extends from the threaded fastener. It may be integral with the threaded fastener or separately attached to the threaded fastener. The planar surface of the flange is substantially perpendicular to the longitudinal axis of the threaded fastener. The strip is attached to the combined threaded fastener and the flange. The strip is inserted into the one or more slots such that the threaded fastener is suspended within the cage. The walls and the flange are shaped such that rotation of the flange within the walls is limited. The one or more slots and the strip are shaped such that the fastener may float in two dimensions coplanar to the cage.

In the preferred embodiment a plate connects the exit end of the walls. This strengthens the cage structure. The one or more slots and the strip should be shaped such that the threaded fastener may float in three dimensions within the cage. The strip should be fabricated from a flexible nonconductive material. This facilitates removal of the flange and the threaded fastener from the cage. It also limits the tendency of the strip to become coated during a coating process performed upon a structure to which the cage threaded fastener assembly is attached. The flange and the nut may also be coated with an anti-corrosive material, such as zinc, to prevent corrosion of the cage threaded fastener assembly or a fastener which mates with the cage threaded fastener assembly after installation.

DRAWINGS

These and other features, aspects, and advantages of the present invention will become better understood with regard to the following description, appended claims, and accompanying drawings where:

FIG. 4 is a bottom view of the cage nut assembly of FIG. 2.

FIG. 5 is a side elevation view of the cage nut assembly of FIG. 2.

FIG. 6 is a side elevation view of another side of the cage nut assembly of FIG. 2.

FIG. 7 is a side elevation view of an alternate embodiment of a cage nut assembly.

FIG. 8 is a side elevation view of another side of the alternate embodiment of the cage nut assembly of FIG. 7.

FIG. 9 is a side elevation view of another alternate embodiment of a cage nut assembly.

DESCRIPTION

Figure 2:
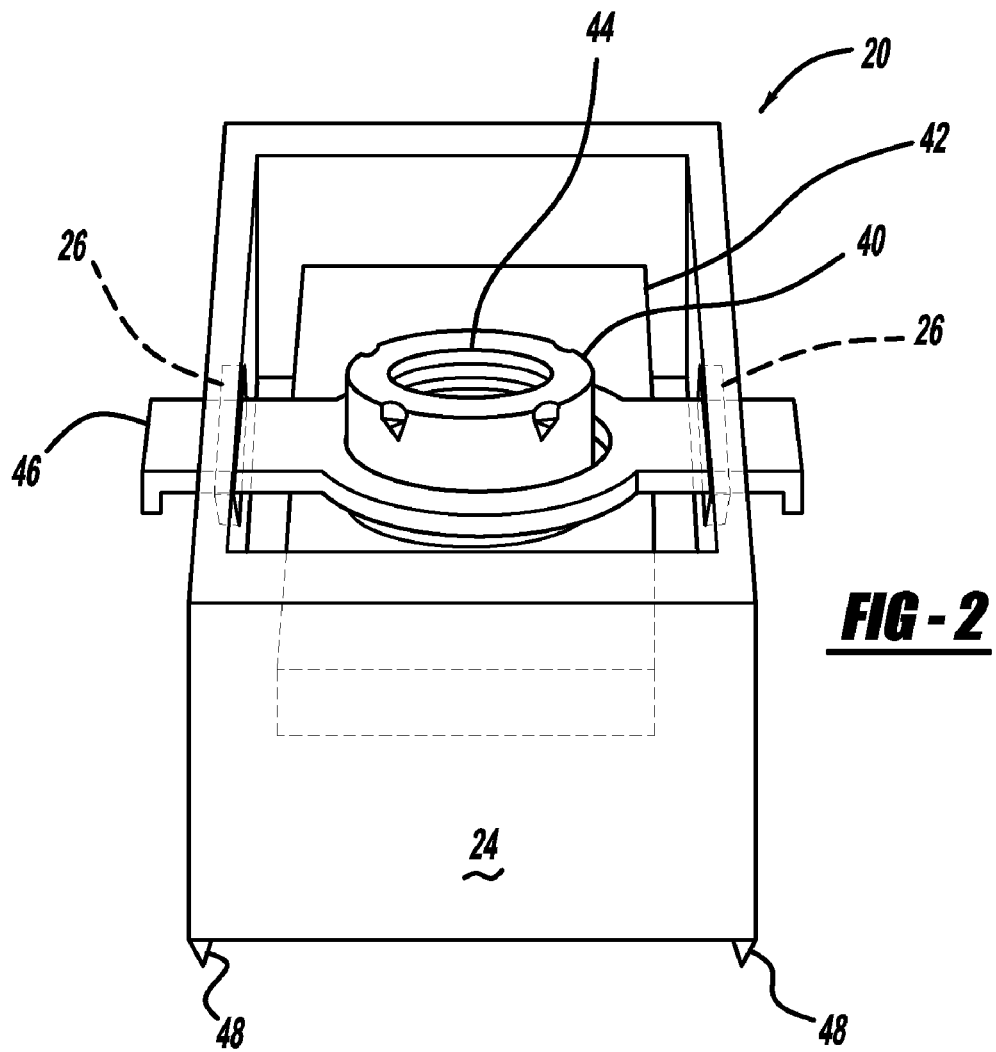
FIG. 2 is a perspective view of my cage nut assembly.
Figure 12:
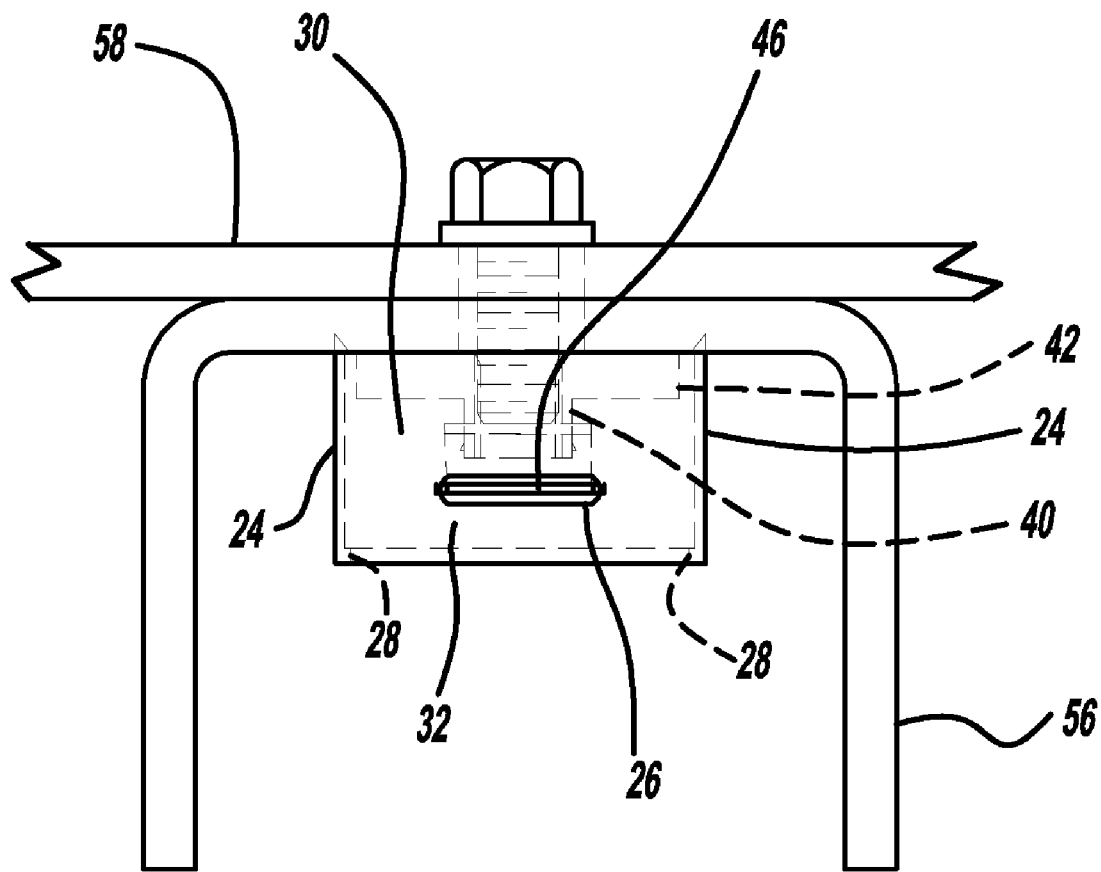
FIG. 12 is a side elevation view of the body parts of FIG. 11 attached together by the bolt and cage nut assembly of FIG. 11.

The preferred embodiment of a cage nut assembly 20 is comprised of a cage 22, a pair of slots 26, a nut 40, a flange 42 and a strip 46. The cage 22 has four walls 24. Other embodiments of the invention have more and less than four walls 24. The walls 24 form a four sided rectangular (or square) enclosure, as shown in FIG. 2. The enclosure encloses the nut 40 and the flange 42. The cage 22 has an entrance end 30 and an exit end 32. A bolt intended to mate with the nut 40 enters the cage 22 at the entrance end 30. The bolt entrance end 30 has an opening 34 which allows the stem of the bolt to pass therethrough. After the cage nut assembly 20 is attached to a body part 56, the exit end 32 is spaced apart from the body part 56, as shown in FIG. 12. The stem of a bolt may pass through both the entrance end 30 and the exit end 32. Steel is the preferred material for fabrication of the cage 22. The walls 24 may be provided with lightening holes to reduce the overall weight of the cage nut assembly 20 and, also, to reduce its manufacturing expense by requiring less raw material for manufacture.

A pair of opposing walls 24 are each provided with a slot 26. The slots 26 are intended to receive and hold the strip 46.

The flange 42 extends from the nut 40. The flange 42 is oriented with respect to the nut 40 such that the planar surface of the flange 42 is substantially perpendicular to the longitudinal axis of the nut 40, as shown in FIG. 2. Thus, the angle between the longitudinal axis of the nut 40 and the planar surface of the flange 42 is approximately 90°. The flange 42 and the nut 40 have a common opening 44. This opening is shown in FIG. 9. The common opening 44 of the nut 40 and the flange 42 is threaded. In alternate embodiments the flange 42 maybe unthreaded or partially threaded. Reference number 44 refers to the opening within the flange 42 and the nut 40. Reference number 34 refers to the opening within the cage 22 at the bolt entrance end 30. The threads will receive and engage with the threaded stem of a bolt.

The strip 46 is attached to the combined nut 40 and flange 42, as shown in FIG. 2. Parts of the periphery of the nut 40 may be deformed such that the strip 46 becomes physically attached to the nut 40 and the flange 42, as shown in FIG. 2. However, this invention is not limited by the manner in which the strip 46 is attached to or extends from the combined nut 40 and flange 42. Each end of the strip 46 is inserted into a slot 26 to suspend the nut 40 and flange 42 within the cage, as shown in FIG. 2. The slots 26 and the strip 46 are shaped such that the nut 40 may float in two dimensions. The two dimensions are along a hypothetical plane which is parallel to a hypothetical plane sitting on top of the walls 24 and a hypothetical plane sitting on the bottom of the walls 24. The shape of the slots 26 and the shape of the strip 46 are also such that the flange 42 remains substantially coplanar to the wall 24 opening at the bolt entrance end 30 of the cage 22. This facilitates insertion of a bolt into the nut 40 because the longitudinal axis of the bolt and the longitudinal axis of the nut 40 will tend to align. The two-dimensional float allows the nut 40 and the flange 42 to be repositioned without repositioning the cage 22. In other words, the cage 22 can be attached to a body part 56 without the longitudinal axis of the nut 40 being perfectly aligned with the longitudinal axis of a mating male bolt. The two-dimensional float allows this alignment to take place after the cage 22 is attached to the body part 56. The slots 26 and the strip 46 should also be configured to permit three-dimensional float of the nut 40 and the flange 42 while the planar surface of the flange 42 remains parallel to the planar surface of the exit end 32 of the cage 22. In other words, if the planar surface of the flange 42 is along an orthogonal x-axis and y-axis, the third dimension of the three-dimensional float will be along the orthogonal z-axis.

The strip 46 should be adapted to be flexible and nonconductive. Flexibility promotes both two-dimensional and three-dimensional float, as described. Flexibility of the strip 46 also promotes removal of the flange 42 and the nut 40 through the bottom opening (exit end 32) after the cage nut assembly 20 is permanently affixed to a body structure. A nonconductive strip 46 will not attract electrocoating material when the structures to which the cage nut assembly 20 is attached are subjected to an electrocoating process. Preferably, the strip 46 is fabricated from steel or plastic. It may also be coated with Teflon or another nonconductive material to minimize adhesion with paint or electrocoating material.

Figure 1:
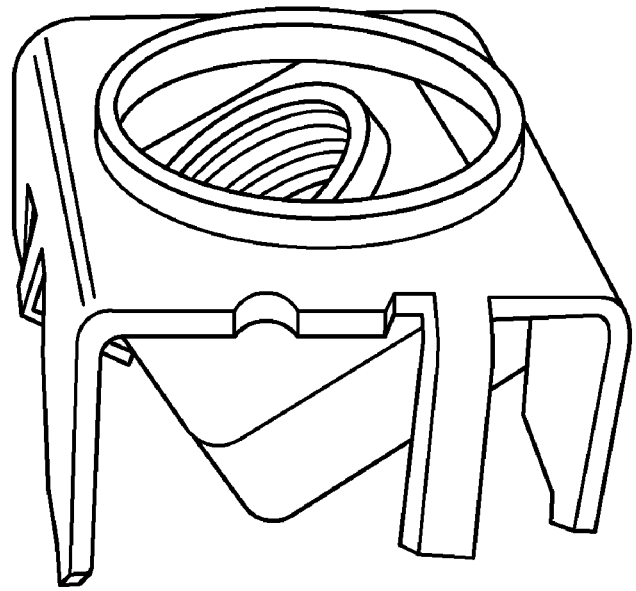
FIG. 1 is a perspective view of a prior art cage nut assembly.

The walls 24 and the flange 42 are shaped such that rotation of the flange 42 about the longitudinal axis of the nut 40 within the walls 24 is limited. This is shown in FIG. 2. Only a very limited rotation of the flange 42 about the longitudinal axis of the nut 40 is permitted. Further rotation is prevented by contact between the flange 42 and the walls 24. This permits a bolt threaded within the nut 40 to be tightened to a very high degree of torque. Prior art cage nut assemblies, such as the one shown in FIG. 1, typically have only three walls. The omitted fourth wall is necessary to allow removal of the nut and flange after attachment of the cage nut assembly. Therefore, prior art cage nut assemblies having three walls, wherein the dimensions and materials of the walls and the flange are otherwise the same as the cage nut assembly 20 described herein, will not withstand the same amount of fastener torque which my cage nut assembly 20 will withstand. The cage nut assembly 20 described herein has additional rigidity because of the fourth wall 24 which, together with the three other walls 24, forms a four sided enclosure.

My cage nut assembly 20 permits removal of the flange 42 and the nut 40 through the exit end 32 of the cage 22. The exit end 32 of the cage 22 is open such that the flange 42 may pass therethrough. This permits removal of the flange 42 and the nut 40 for repair or reuse. It also permits the use of a four sided enclosed cage structure which increases the maximum amount of torque applied by the flange 42 which the cage 22 may withstand. The maximum allowable bolt torque may also be increased by adding a plate to the bottom of the cage 22. The plate 28 connects the exit end 32 of the walls 24. The plate 28 has an opening which allows removal of the flange 42 and the nut 40. Therefore, the flange 42 and the nut 40 may still be removed through the bottom of the cage (i.e. exit end 32) because the opening within the plate 28 accommodates removal.

Figure 3:
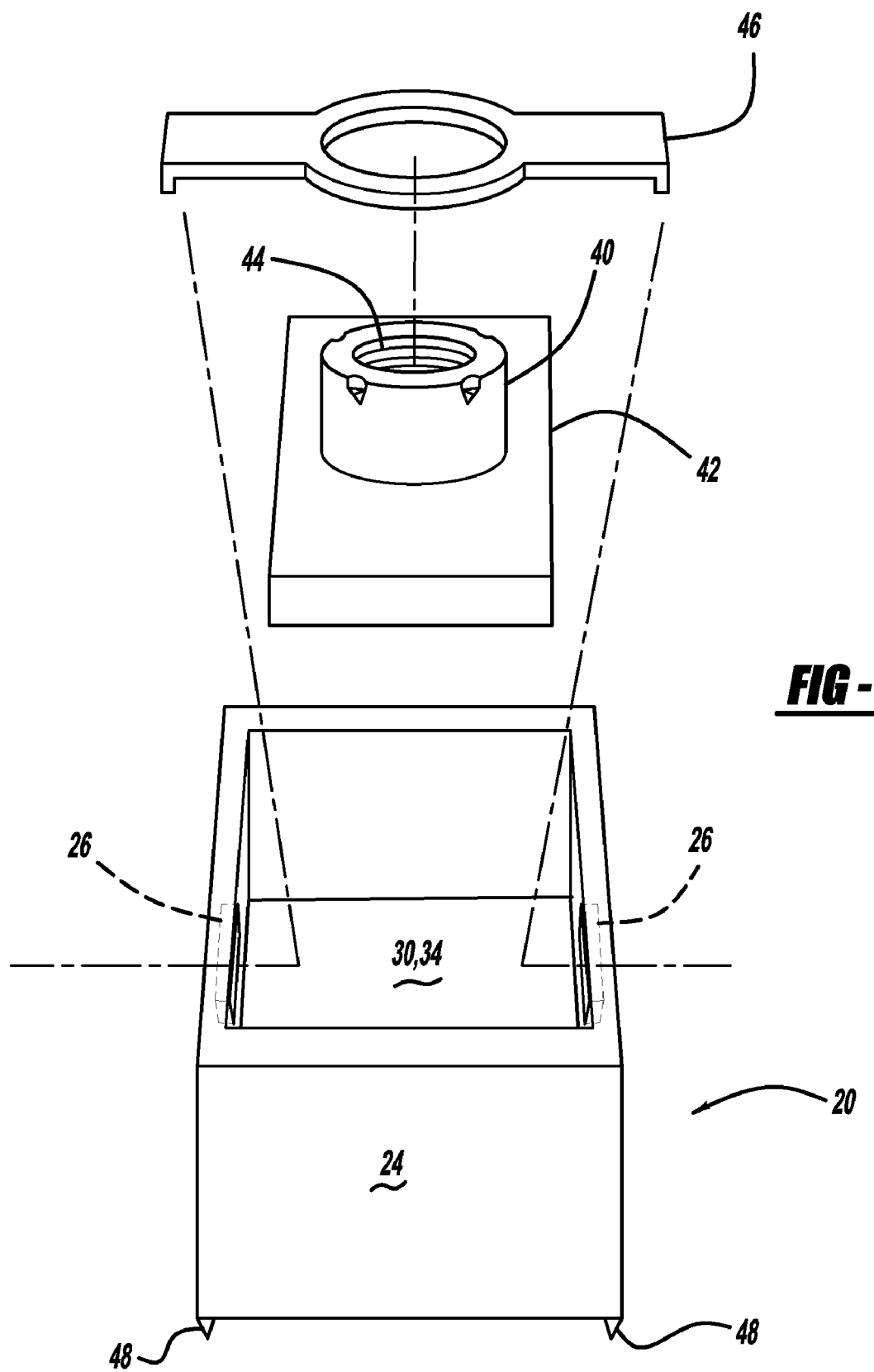
FIG. 3 is an exploded perspective view of the cage nut assembly of FIG. 2.
Figure 10:
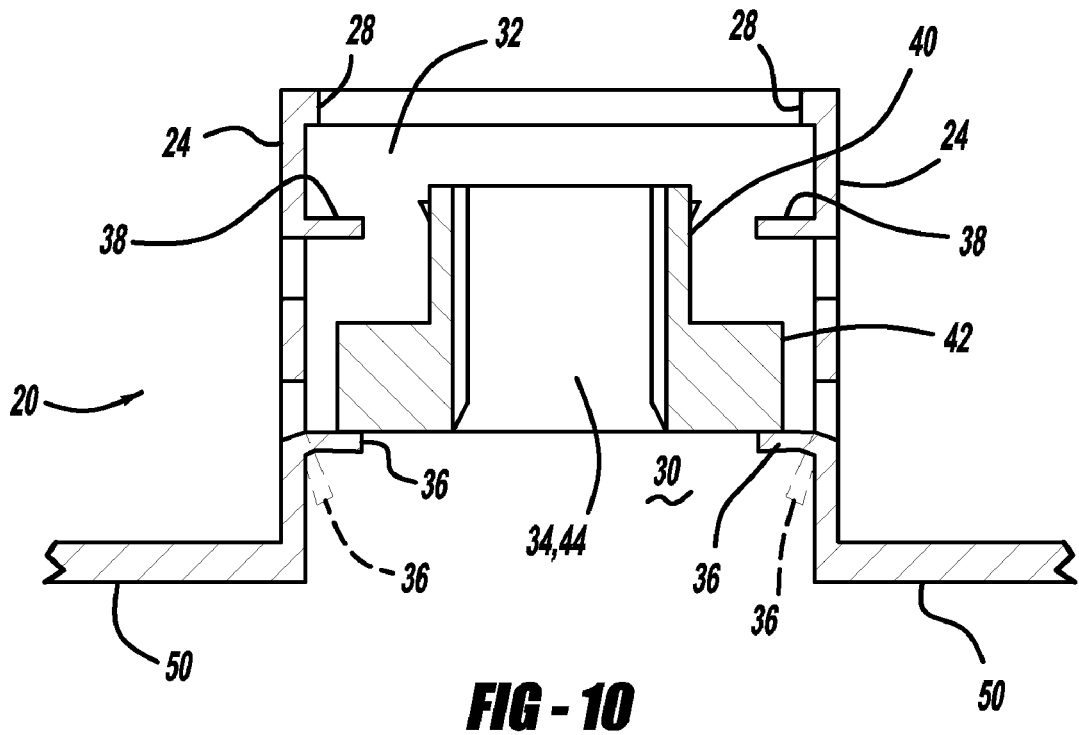
FIG. 10 is a side elevation view of an alternate embodiment of a cage nut assembly having upper tabs and lower tabs within its cage.

Three structures which facilitate the attachment of the cage nut assembly 20 to a body part 56 are shown within the drawings. FIG. 2 and FIG. 3 show weld projections 48 extending from the entrance end 30 of the cage 22. The weld projections 48 facilitate attachment of the cage nut assembly to a body part 56 by resistance welding. FIG. 9 and FIG. 10 show weld flanges 50 extending from the entrance end of the cage 22. These weld flanges 50 may be directly welded to a body part 56. FIG. 7 and FIG. 8 show snap projections 52 projecting from the entrance end 30 of the cage 22. These snap projections 52 fit within snap openings 54 within a body part 56. The snap projections 52 and the snap openings 54 are adapted to permit the cage nut assembly 20 to be secured to the body part 56 by snapping the cage nut assembly 20 onto the body part 56.

Another embodiment of the cage nut assembly 20 is shown in FIG. 10. In that embodiment a strip is not used to suspend the nut 40 and the flange 42. Instead, the nut 40 and the flange 42 are suspended by a plurality of upper tabs 36 and a plurality of lower tabs 38, as shown in FIG. 10. The upper tabs 36 substantially perpendicularly extend from two of the walls 24 within the cage 22. The upper tabs 36 are positioned proximal to the bolt entrance end 30 of the cage. The upper tabs 36 limit contact between the flange 42/nut 40 combination and the cage 22, as well as any workpiece to which the cage 22 is attached. The lower tabs 38 also substantially perpendicularly extend from two of the walls 24 within the cage 22. The lower tabs 38 are positioned proximal to the bolt exit end 32 of the cage 22. The lower tabs 38 orient the flange 42/nut 40 combination within the cage 22 and retain the flange 42/nut 40 combination within the cage 22. The upper tabs 36 and the lower tabs 38 are small (relative to the opening within the cage) bendable projections. The flange 42 and the nut 40 are positioned between the upper tabs 36 and the lower tabs 38. The upper tabs 36 and the lower tabs 38 are shaped and positioned such that the nut 40 may float in two dimensions coplanar to the cage 22 and such that the flange 42 remains substantially coplanar to the wall opening at the bolt entrance end 30 of the cage 22. This is similar to the two and three-dimensional float of the previously described embodiment. The upper tabs 36 bend out of the way and permit the flange 42 to move toward the entrance end 30 of the cage when a bolt is tightened within the nut 40. Similarly, the lower tabs 38 may be bent out of the way and permit the flange 42 to be removed from the cage 22 through the exit end 32 of the cage 22.

Figure 11:
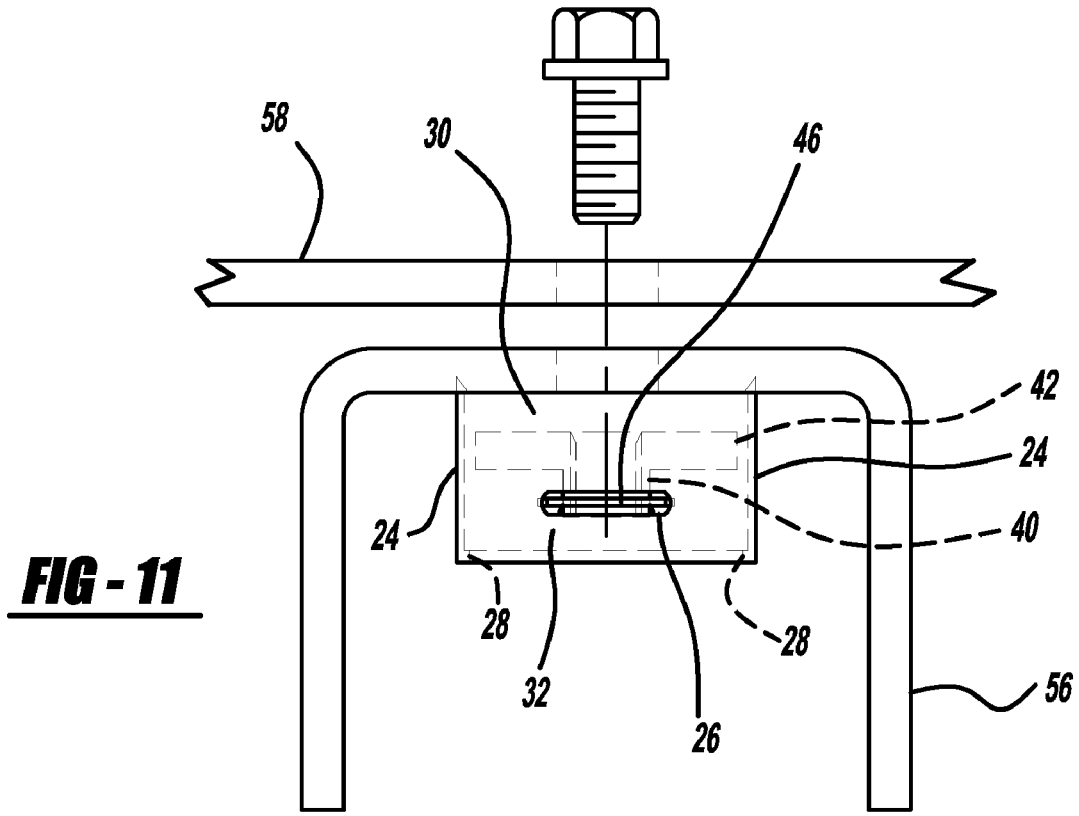
FIG. 11 is an exploded side elevation view of two body parts about to be attached together by a bolt and a cage nut assembly.

A typical use of a cage nut assembly is the attachment of a second body part 58 to a first body part 56. For example, the first body part 56 may be an automobile door pillar. The second body part 58 may be an automobile door hinge. The object is to attach the door hinge to the door pillar. The nut 40 within the cage 22 must have the two-dimensional float previously described in order to facilitate proper positioning of the automobile door, which is attached to the door hinge, within the automobile body. The second body part (the hinge) 58 is to be attached to the first body part (door pillar) 56 with a bolt, as shown in FIG. 11 and FIG. 12. The first step of the attachment process is to attach the cage 22 to the first body part (door pillar) 56. The cage 22 may be welded into place using weld projections 48 or weld flanges 50, depending upon the configuration of the cage nut assembly 20. Alternatively, if the cage nut assembly 20 is provided with snap projections 52, the cage 22 is attached to the first body part 56 by snapping the snap projections 52 of the cage nut assembly 20 into snap openings 54 appropriately positioned upon the first body part (door pillar). The body parts 56, 58 may be painted or electrocoated after the cage nut assembly 20 is attached, without any significant welding of the nut 40 and the flange 42 to the cage 22 or to the first body part 56, because contact between the nut 40 and the flange 42 and surfaces of the cage 22 or the first body part 56 is minimized due to the suspension of the nut 40 and the flange 42 within the cage 22. The welding affect is also reduced when a nonconductive strip 46 is used. Electrocoating material tends to not adhere to a nonconductive strip 46. After the cage nut assembly 20 is attached to the first body part (door pillar) 56, the second body part (door hinge) 58 is lined up with the first body part (door pillar) 56 such that a bolt may be inserted through both body parts 56, 58 and threaded into the flange 42 and the nut 40. Initially, the bolt is not fully tightened. In the example given, a door is attached to the second body part (hinge) 58 and the door is aligned within the automobile body opening. After proper alignment of the door is obtained the bolt is tightened. In the strip configuration of the cage nut assembly 20, the strip 46 bends to permit the nut 40 and the flange 42 to seat upon the first body part (door pillar) 56, as shown in FIG. 12. In the configuration of the cage nut assembly 20 which uses upper tabs 36 and lower tabs 38, the upper tabs 36 bend out of the way to permit the nut 40 and the flange 42 to seat upon the first body part (door pillar) 56. After appropriate alignment is obtained between the body parts 56, 58, the bolt is tightened by applying a tightening torque to it. During tightening of the bolt, the flange 42 is prevented from rotating by one or more walls 24 of the cage 22. When, and if, it is necessary to remove the nut 40 and the flange 42 from the cage nut assembly 20 which has been attached to a first body part 56, the nut 40 and the flange 42 may be removed from the exit end 32 of the cage 22. The opening at the exit end 32 of the cage 22 is large enough to permit removal of the flange 42 and the nut 40, as previously described. In the strip configuration, the strip bends and comes out of the slots 26 during the removal process. In the tab configuration, the lower tabs 38 bent out of the way during the removal process. The ability to remove the nut 40 and the flange 42 through the exit end 32 of the cage 22 permits the cage nut assembly 20 to be mounted to a body part 56 at any rotational angle of the cage nut assembly 20 about the longitudinal axis of a securing bolt. The mounting position of the cage nut assembly 20 upon a body part 56 is not limited by the need to have one side of the cage 22 positioned to permit lateral removal of the flange 42 and the nut 40 without interference from the body part 56.

The cage nut assembly 20 described herein has many advantages compared to prior art cage nut assemblies.

Greater torque may be applied to the bolt without deforming the cage 22 because the cage has four connected walls (in the preferred embodiment) rather than having three walls which do not form an enclosed structure, as in the prior art devices. The nut 40 and the flange 42 remain coplanar to the entrance end 30 opening, as shown in FIG. 2. Prior art devices exhibit a lesser degree of coplanarity, as shown and FIG. 1. The cage nut assembly 20 described herein may be configured so that the nut 40 and the flange 42 float more precisely in three dimensions. The cage nut assembly 20 described herein allows removal of the nut 40 and the flange 42 through one end of the cage 22, rather than through a side opening such as that shown in the foreground of FIG. 1. This provides much more flexibility with respect to the mounting of the cage 22 to a body part 56. Manufacturing cost is also reduced. My cage nut assembly 20 has a higher immunity to paint welding and electrocoating welding and contamination. Any need to coat the flange 42 and the nut 40 with a material, such as Teflon, which has minimal adhesion to paint and electrocoating material is reduced.

Although the invention has been shown and described with reference to certain preferred embodiments and methods, those skilled in the art undoubtedly will find alternative embodiments and methods obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A cage threaded fastener assembly comprising:
   (a) a cage having a plurality of walls which encase a threaded fastener and a flange, said cage having an entrance end and an exit end, said flange having a planar surface, said threaded fastener having a longitudinal axis;
   (b) a slot in each of one or more of the walls;
   (c) a plate connecting the exit end of the walls for strengthening the cage structure;
   (d) said flange extending from the threaded fastener such that the planar surface of the flange is substantially perpendicular to the longitudinal axis of the threaded fastener, said flange and said threaded fastener forming a combined threaded fastener and flange;
   (e) a strip attached to the combined threaded fastener and flange;
   (f) said strip being inserted into the one or more slots such that the threaded fastener is suspended within the cage;
   (g) wherein the walls and the flange are shaped such that rotation of the flange within the walls is limited; and
   (h) wherein the one or more slots and the strip are shaped such that the fastener may float in two dimensions coplanar to the cage.

2. The cage threaded fastener assembly of claim 1, wherein the threaded fastener is a nut.

3. The cage threaded fastener assembly of claim 1, wherein the one or more slots and the strip are shaped such that the threaded fastener may float in three dimensions.

4. The cage threaded fastener assembly of claim 1, wherein the strip is fabricated from a flexible non conductive material for facilitating removal of the flange and the threaded fastener from the cage and for limiting the tendency of the strip to become coated during a coating process performed upon a structure to which the cage threaded fastener assembly is attached.

5. The cage threaded fastener assembly of claim 1, wherein the flange and the nut are coated with an anti-corrosive material.

6. The cage threaded fastener assembly of claim 1, wherein the cage is coated with an anti-corrosive material.

7. A cage nut assembly comprising:
   (a) a cage having four walls forming a four sided enclosure which encases a nut and a flange, said cage having a bolt entrance end and a bolt exit end, said bolt entrance end having an opening such that the stem of a bolt may pass therethrough, said flange having a planar surface, said nut having a longitudinal axis;
   (b) a slot in each of a pair of walls;
   (c) ;
   (d) said flange extending from the nut such that the planar surface of the flange is substantially perpendicular to the longitudinal axis of the nut, wherein the flange and the nut have a common opening for receiving the threaded stem of a bolt, said flange and said nut forming a combined nut and flange;
   (e) a strip attached to the combined nut and flange;
   (f) said strip being inserted into the slots such that the nut is suspended within the cage;
   (g) wherein the walls and the flange are shaped such that rotation of the flange about the longitudinal axis of the nut within the walls is limited;
   (h) wherein the slots and the strip are shaped such that the nut may float in two dimensions; and
   (i) wherein the bolt exit end of the cage is open such that the flange may pass therethrough for removal of the flange and the nut for repair or reuse.

8. The cage nut assembly of claim 7, further comprising a plate connecting the exit end of the walls for strengthening the cage structure.

9. The cage nut assembly of claim 7, wherein the slots and the strip are shaped such that the nut may float in three dimensions.

10. The cage nut assembly of claim 7, wherein the strip is adapted to be flexible and non-conductive.

11. The cage nut assembly of claim 7, wherein the flange and the nut are coated with an anti-corrosive material.

12. The cage nut assembly of claim 7, wherein the cage is coated with an anti-corrosive material.

* * * * *